No. 12,312. REISSUED FEB. 7, 1905.

A. W. COOPER.

RELEASING DEVICE FOR FIREPROOF WINDOWS.

APPLICATION FILED JAN. 11, 1905.

Witnesses:

W. A. Milord.

H. Benjamin.

Inventor:

Arthur W. Cooper

By

Frederick Benjamin

Atty.

PHOTO-LITHOGRAPHED BY SACHETT & WILHELMS LITHG. & PTG. CO. NEW YORK.

No. 12,312. Reissued February 7, 1905.

UNITED STATES PATENT OFFICE.

ARTHUR W. COOPER, OF CHICAGO, ILLINOIS, ASSIGNOR OF ONE-HALF TO JOHN A. KNISELY, OF CHICAGO, ILLINOIS.

RELEASING DEVICE FOR FIREPROOF WINDOWS.

SPECIFICATION forming part of Reissued Letters Patent No. 12,312, dated February 7, 1905.

Original No. 764,918, dated July 12, 1904. Application for reissue filed January 11, 1905. Serial No. 240,654.

*To all whom it may concern:*

Be it known that I, ARTHUR W. COOPER, a citizen of the United States, residing at Chicago, in the county of Cook and State of Illinois, have invented certain new and useful Improvements in Releasing Devices for Fireproof Windows, of which the following is a specification.

This invention relates to means for holding and releasing pivoted windows or other closures, the releasing elements to operate automatically in case of a rise of temperature in the vicinity of the closure, due to a fire in an adjoining structure, or in the building in which said window or closure is used.

Various methods have been adopted for releasing windows, transoms, and the like, so that they will close automatically when subjected to a high temperature, in most of which a fusible link or similar device is used as an element of or in combination with a chain which is attached at one end to the top of the inner side of the sash and at the other end to the frame or sill. In these devices the element which fuses is placed at some point in the chain on the inner side of the sash, and when a fire occurs from without the building such element is therefore a considerable distance from the source of heat and will not in many instances be operatively affected until the fire has made so much headway as to warp the sash or its frame by expanding the metal and prevent the former from closing. As the primary purpose in using these automatic releasing devices is to protect the building from fire in adjoining or adjacent structures, such purpose is, in part at least, defeated by placing the fusible element inside the building which it is desired to protect. It will therefore be seen that it becomes desirable to place the fusible element on the outside of the window and as near the danger-point—*i. e.*, the adjacent building—as the circumstances will permit.

Having in mind the conditions above outlined, I have provided fusible holding and releasing means and so arranged same that they, by reason of their position and connection, will be quickly affected by fire, whether it occurs from without or within the building.

My invention in a preferred adaptation is illustrated in the accompanying drawings, which form a part of this application, in which—

Figure 1:
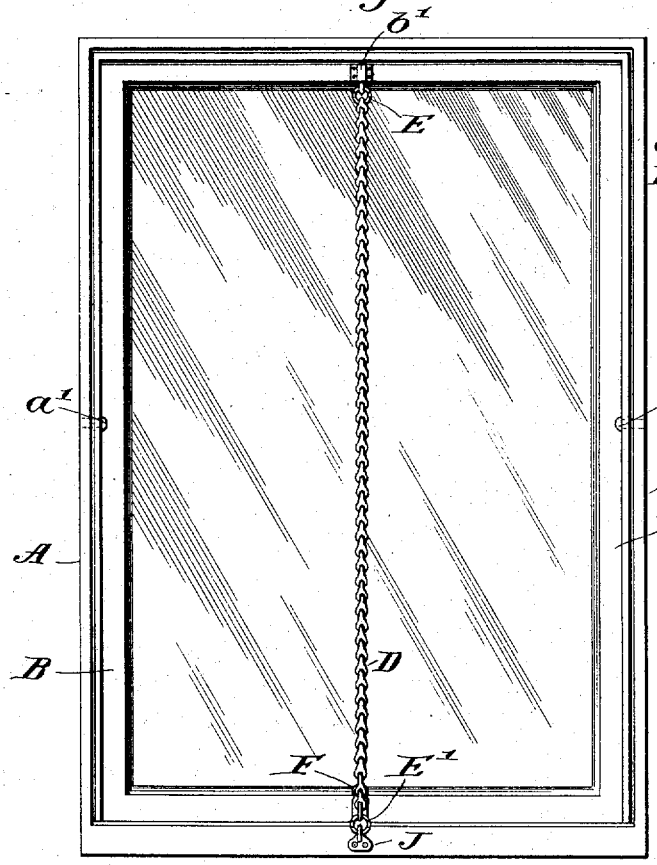
Figure 2:
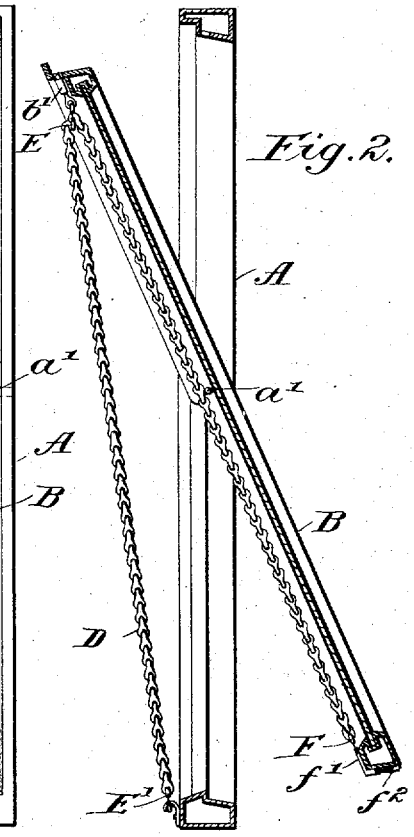
Figure 3:
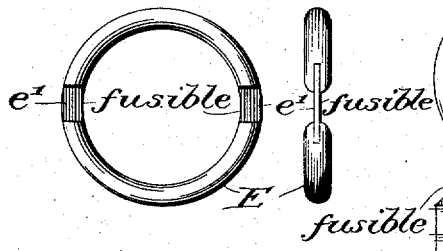
Figure 4:
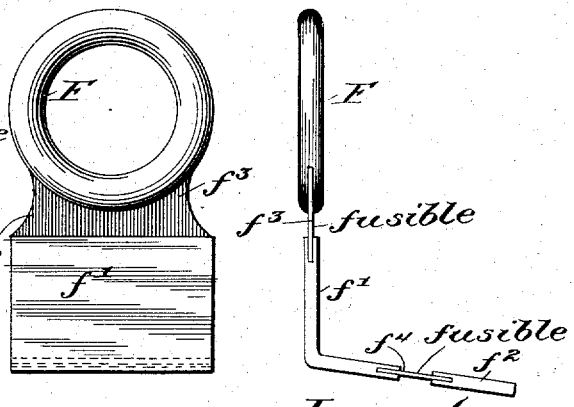

Figure 1 shows the inside elevation of a window equipped according to my invention. Fig. 2 is a vertical section through a window frame and sash, the latter partly open and my invention shown applied thereto. Fig. 3 comprises face and edge views of a form of fusible element which is specially adapted to my invention; and Fig. 4 comprises face and edge views of a second fusible device, which forms an element of my invention.

Referring to the drawings, A represents a window-frame, and B a sash fitted thereto, both being constructed of sheet metal in any form that may be desired. The sash is hung and swings on horizontal pivots $a'$, which are placed above the center of the sash, so that the latter will swing closed by gravity when not held by the chain D.

At the top of the sash is fixed an eyebolt-latch $b'$ of common form, and in the eye of the bolt is placed a ring E, which is made in two semi-annular portions, the ends of which are secured together by fusible metal $e'$, as shown in Fig. 3.

At the bottom of the sash is secured in the manner to be explained a second fusible element composed of the ring F, an angularly-bent plate $f'$, and a flat plate $f^2$. The ring F and the angular plate are joined by a section of fusible metal, as $f^3$, and the angular plate and flat plate are joined by a strip of fusible metal $f^4$, all as clearly indicated in Fig. 4.

A chain D is provided, on the inner end of which is secured a fusible ring E′ in all respects like the ring E, and same is therefore adapted to fit over the hook J, which is secured to the inner side of the sill of the frame. The chain is passed loosely through the ring E of the top of the sash and then extends downwardly over the inside of the sash and has its outer end attached to the ring F. The plate $f^2$ is soldered or otherwise suitably connected with the bottom of the sash, and such is preferably the only means of holding the fusible element of which the plate $f^2$ is a part on the sash.

From the construction and arrangement of parts above described it will be apparent, first, that if heat approaches the open window from outside it will reach first the plate $f^2$ and fusing the link or strip $f^4$ will thereby release the parts $f'$ and F, and hence disconnect the chain from the bottom of the sash, so that the latter may swing closed by gravity in the usual way. If for any reason the link $f^4$ should fail to fuse when so exposed, the link $f^3$ may soften and the same disconnection of the chain will result. Second, that if the fire should occur within the building equipped with my invention either the ring E or E′ will be exposed to the heat and upon fusing will disconnect the chain from the top of the sash or the sill of the frame, as the case may be, whereupon the sash will be permitted to revolve on its pivots to its closed position.

It will be apparent that instead of using a fusible element at the top of the sash through which the chain passes a non-fusible ring or link may be substituted. It will also be apparent that various forms may be substituted for the fusible element F, provided they are capable of being attached to the bottom of the sash. I do not wish, therefore, to be limited in my patent to the specific form of fusible element which connects the outer end of the chain to the bottom of the sash or closure; but

What I claim, and desire to secure by Letters Patent, is—

1. In combination with a closure mounted to swing on horizontal pivots, and a frame adapted to receive said closure, a fusible ring secured at the top of the closure, a fusible device secured at the bottom edge of the closure, a chain having one end attached to said fusible device, passing loosely through the ring at the top of the closure and extending downwardly on the inner side of the closure, and means for securing the inner end of said chain.

2. In combination with a closure mounted to swing on horizontal pivots, and a frame adapted to receive said closure, a ring attached to the top of the closure, a fusible device secured at the bottom of the closure, a chain having one end attached to said fusible device, passing upwardly loosely through the ring at the top of the closure, and passing downwardly on the inner side of the closure, and fusible means for securing the inner end of said chain to the sill of the frame.

3. In combination with a closure mounted to swing on horizontal pivots, and a frame adapted to receive said closure, a fusible ring attached at the top of the closure, a fusible device secured at the bottom of the closure, a chain having one end permanently connected with said fusible device, passing upwardly through said ring at the top of the closure, and then passing downwardly on the inner side of the closure, a fusible element connected with the inner end of the chain, and means of detachably connecting said element with the bottom of said frame, substantially as described.

4. In closure holding and releasing means of the class described, a fusible device comprising an angular plate, a ring and a flat plate, and fusible links connecting said parts together.

5. In combination with a swinging closure and a frame on which said closure is swung, a fusible element secured to the edge of the closure that extends outside of the frame, a link secured to the closure above its pivotal point, a catch secured to the inner side of the sill of the frame, and a chain connected with the fusible element on the closure, passing loosely through said link on the closure and adapted to be detachably secured to the catch on the sill of the frame.

In testimony whereof I affix my signature in presence of two witnesses.

ARTHUR W. COOPER.

Witnesses:

JOHN A. KNISELY,

F. BENJAMIN.